United States Patent Office 3,324,172
Patented June 6, 1967

3,324,172
A-NORSTEROIDS
Seymour D. Levine, Princeton, and Pacifico A. Principe, South River, N.J., assignors, by mesne assignments, to E. R. Squibb & Sons, Inc., New York, N.Y., a corporation of Delaware
No Drawing. Filed Feb. 2, 1965, Ser. No. 429,926
6 Claims. (Cl. 260—488)

This application is a continuation-in-part of a previous application, Ser. No. 397,035, filed Sept. 16, 1964, now abandoned.

This invention relates to and has as its object the provision of novel physiologically active steroids, methods for their production and new intermediates useful in said preparation.

More particularly, this invention relates to the production of compounds of the formula

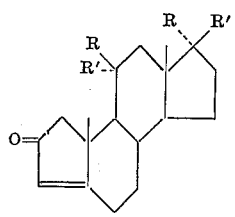

wherein each R is hydrogen; each R' is selected from the group consisting of hydroxy and acyloxy; and together R and R' is oxo (O=).

The preferred acyl and acyloxy radicals are those of hydrocarbon carboxylic acids of less than twelve carbon atoms, as exemplified by the lower alkanoic acids (e.g., acetic, propionic, butyric and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cyloalkylene carboxylic acids.

The compounds of the instant invention are physiologically active steroids which possess anti-androgenic activity, i.e., they inhibit the action of androgens, and they may be used in the treatment of such conditions as hyperandrogenic acne. The compounds may be formulated for such administration, the concentration and/or dosage being based on the activity of the particular compound and the requirements of the patient.

The novel compounds of this invention may be prepared according to the process of this invention by employing as starting material, compounds of the formula

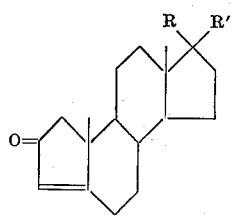

wherein R is hydrogen; R' is selected from the group consisting of acyl and hydroxy and together R and R' is keto. Among the suitable starting materials can be included such compounds at Δ³-A-norandrostene-2,17-dione; A-nortestosterone and A-norprogesterone.

The novel compounds of the instant invention may be prepared from the starting materials employed herein by subjecting the latter to the action of a fungus or to the action of the enzymes thereof under oxidizing and preferably aerobic conditions.

The fungi which may be employed in the practice of this invention include fungi of the genus Rhizopus and Fusarium. More particularly, the fungi employed are Rhrizopus nigricans (ATCC 15441) and Fusarium javanicum var. ensiforme (QM-524; U.S. Army Quartermaster, Natick, Mass.).

To obtain the novel compounds of this invention, the respective starting material is subjected to the action of the fungi of this invention under oxidizing conditions. This oxidation can best be effected by either including the starting material in an aerobic culture of the microorganism, or by bringing together, in an aqueous medium, the compounds, air, and enzymes of non-proliferating cells of the microorganism.

In general, the conditions of culturing the fungi for the purposes of this invention are (except for the inclusion of the starting material to be converted) the same as those of culturing various other molds for the production of antibiotic and/or vitamin B-12, i.e., the microorganism is aerobically grown in contact with (in or on) a suitable fermentation medium. A suitable medium essentially comprises a source of carbon and energy. The latter may be a carbohydrate (such as sucrose, molasses, glucose, maltose, starch, or dextrin), a fatty acid, a fat and/or the compound itself. Preferably, however, the medium includes an assimilable source of carbon and energy in addition to the steroid. Among the fats utilizable for the purpose of this invention are: lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein, and trilaurin. Among the fatty acids ultilizable for the purpose of this invention are: stearic acid, palmitic acid, oleic acid, linoleic acid, and myristic acid.

The source of nitrogenous factors may be organic (e.g., soybean meal, corn steep liquor, meat extract and/or distillers solubles) or synthetic (i.e., composed of simple, synthesizable organic or inorganic compounds such as ammonium salts, alkali nitrates, amino acids or urea).

An adequate sterile-air supply should be maintained during fermentation, for example, by the conventional methods of exposing a large surface of the medium to air or by utilizing submerged aerated culture. The compound may be added to the culture during the incubation period, or included in the medium prior to sterilization or inoculation. The preferred (but not limiting) range of concentration of the starting material is about 0.01 to 0.10%. The culture period (or rather the time of subjecting the compound to the action of the enzyme) may vary considerably, the range of about six to ninety-six hours being feasible, but not limiting.

The process yields, inter alia, Δ³-A-norandrostene-11α-ol-2,17-dione and Δ³-A-norandrostene-11α,17β-diol-2-one which may be separated from the broth by extraction and from other concomitantly produced compounds by chromatographic separation. The Δ³-A-norandrostene-11α-ol-2,17-dione and the Δ³-A-norandrostene-11α,17β-diol-2-one can be respectively esterified in the usual manner, as by treatment with the desired acid anhydride or acyl halide in an organic solvent (preferably in an organic base such as pyridine) to yield the 11α-monoacylate or the 11,17-diacylate derivative, respectively.

In addition, the 11α-hydroxy compounds may be oxidized as by treatment with chromic acid to yield the 11-keto derivatives, which are also new compounds of the instant invention.

The following examples are illustrative of the invention:

*Example 1.—$\Delta^3$-A-norandrostene-11α-ol-2,17-dione*

(A) *Fermentation.*—Surface growth from each of two two-week-old agar slants of *Rhizopus nigricans* (ATCC 15441), the slants containing as a nutrient medium (A):

| | Grams |
|---|---|
| Glucose | 10 |
| Yeast extract | 2.5 |
| $K_2HPO_4$ | 1 |
| Agar | 20 |

Distilled water to 1 liter.

is suspended in 5 ml. of 0.01% aqueous sodium lauryl sulfate solution. One ml. portions of this suspension are used to inoculate four 250 ml. Erlenmeyer flasks, each containing 50 ml. of the following sterilized medium (B):

| | Grams |
|---|---|
| Dextrose | 10 |
| Cornsteep liquor | 6 |
| $NH_4H_2PO_4$ | 3 |
| Yeast extract | 2.5 |
| $CaCO_3$ | 2.5 |

Distilled water to 1 liter.

After eighteen hours incubation at 25° with continuous rotary agitation (280 cycles/minute; two-inch radius), 10% (vol./vol.) transfers are made to thirty-four 250 ml. Erlenmeyer flasks, each containing 50 ml. of freshly sterilized medium B plus 300 micrograms/ml. of $\Delta^3$-A-norandrostene-2,17-dione. The steroid is added by supplementing each flask with 0.25 ml. of a sterile solution of the steroid in N,N-dimethylformamide containing 60 mg./ml. of steroid. A total of 500 mg. is fermented. After fifty-one hours of further incubation, using the same conditions as described above, the contents of the flasks are pooled and filtered through a Seitz clarifying pad. The flasks, mycelium and pad are washed with successive 50 ml. portions of warm water. The combined filtrate and washings have a volume of 2000 ml.

(B) *Isolation.*—The thus-obtained filtrate is extracted three times with 750 ml. portions of chloroform. The chloroform extracts are washed three times with 750 ml. portions of water, dried over sodium sulfate, and evaporated in vacuo to give a 496 mg. residue. Plate chromatography of the residue using neutral alumina (Activity V) as the adsorbent and chloroform containing 1% methanol as the developing solvent gives a major band at about Rf 0.3, which is detectable by ultraviolet. Elution with ethyl acetate and rechromatography of the residue as described above gives a 132 mg. residue. This residue is rechromatographed as described above using chloroform as the developing solvent and developed three times. Elution with ethyl acetate gives a 123 mg. residue which is crystallized from isopropyl ether to give 71 mg. of $\Delta^3$-A-norandrostene-11α-ol-2,17-dione having a melting point of 174–176°. The analytical sample is prepared by recrystallization from chloroform-isopropyl ether, M.P. 184–185°, $[\alpha]_D^{26}$ +47° (EtOH);

$\lambda_{max.}^{KBr}$ 2.95, 5.77, 5.85, 6.00 and 6.17 m$\mu$; $\lambda_{max.}^{EtOH}$ 233 m$\mu$ (15,600);

$\tau$ Si(CH$_3$)$_4$ 9.04 (s., 18-Me), 8.72 (s., 19-Me), 6.03 (m., 11-H), 4.23 (s., 3-H).

*Analysis.*—Calc'd for $C_{18}H_{24}O_3$ (288.37): C, 74.97; H, 8.39. Found: C, 74.93; H, 8.36.

*Example 2.—$\Delta^3$-A-norandrostene-11α,17β-diol-2-one*

Following the procedure in Example 1, but substituting A-nortestorterone for $\Delta^3$-A-norandrostene-3,17-dione, there is obtained $\Delta^3$-A-norandrostene-11α,17β-diol-2-one.

*Example 3.—$\Delta^3$-A-norandrostene-11α-ol-2,17-dione acetate*

A mixture of 78 mg. of $\Delta^3$-A-norandrostene-11α-ol-2, 17-dione, 0.1 ml. of pyridine, and 1.0 ml. of acetic anhydride is warmed on a steam bath for three and one-half hours. The reaction mixture is poured into ice-water and extracted three times with ether. The ether extracts are washed with a saturated sodium bicarbonate solution and 8% salt solution, dried over sodium sulfate, and evaporated to dryness. Crystallization of the residue from methanol-isopropyl ether gives 36 mg. of $\Delta^3$-A-norandrostene-11α-ol-2,17-dione acetate having a melting point of 180–181°. The analytical sample is prepared by recrystallization from acetone-hexane, M.P. 180.5–181.5°, $[\alpha]_D^{29}$ +67° (EtOH);

$\lambda_{max.}^{KBr}$ 5.83 (b), 6.16 $\mu$ $\lambda_{max.}^{EtOH}$ 231 m$\mu$ (15,600).

*Analysis.*—Calc'd for $C_{20}H_{26}O_4$ (330.41): C, 72.70; H, 7.93. Found: C, 72.67; H, 7.97.

Similarly, following the procedure set forth in Example 3, but substituting equivalent amounts of propionic anhydride or butyryl chloride for the acidic anhydride, there is obtained the respective propionate and butyrate derivatives of the compound of Example 3.

*Example 4.—$\Delta^3$-A-norandrostene-11α,17β-diol-2-one diacetate*

Following the procedure in Example 3, but substituting $\Delta^3$-A-norandrostene-11α,17β-diol-2-one for $\Delta^3$-A-norandrostene-11α-ol-2,17-dione, there is obtained for $\Delta^3$-A-norandrostene-11α-17β-diol-2-one diacetate, M.P. 199–200°; $[\alpha]_D^{23}$ −8° (EtOH);

$\lambda_{max.}^{KBr}$ 5.79, 5.89 (sh.), 6.16 $\mu$; $\lambda_{max.}^{EtOH}$ 230 m$\mu$ (16,700).

*Analysis.*—Calc'd for $C_{22}H_{30}O_5$ (374.46): C, 70.56; H, 8.08. Found: C, 70.49; H, 8.02.

*Example 5.—$\Delta^3$-A-norandrostene-11α-ol-2,17-dione*

(A) *Fermentation.*—Surface growth from each of two two-week-old agar slants of *Fusarium javanicum* var. *ensiforme* (QM–524; Army Quartermaster, Natick, Mass.), the slants containing the nutrient medium (A) described in Example 1, are suspended in 5 ml. of aqueous 0.01% sodium lauryl sulfate solution. One ml. portions of this suspension are used to inoculate eight 250 ml. Erlenmeyer flasks, each containing 50 ml. of the sterilized medium (B) described in Example 1. After seventy-two hours incubation at 25° with continuous rotary agitation (280 cycles/minute; two-inch radius), 10% (vol./vol.) transfers are made to forty 250 ml. Erlenmeyer flasks, each containing 50 ml. of freshly sterilized medium B plus 300 micrograms/ml. of A-norprogesterone. The steroid is added by supplementing each flask with 0.25 ml. of a sterile solution of the steroid in N,N-dimethylformamide containing 60 mg./ml. of steroid. A total of 600 mg. is fermented. After seventy-two hours of further incubation, using the same conditions described above, the contents of the flasks are pooled and filtered through a Seitz clarifying pad. The flasks, mycelium and pads are washed with successive 50 ml. portions of warm water. The combined filtrate and washings have a volume of 2500 ml.

(B) *Isolation.*—The thus-obtained filtrate is extracted three times with 850 ml. portions of chloroform. The chloroform extracts are washed three times with 850 ml. portions of chloroform. The chloroform extracts are washed three times with 850 ml. portions of water, dried over sodium sulfate, and evaporated in vacuo to give a 615 mg. residue. Plate chromatography of the residue using neutral alumina (Activity V) as the adsorbent and chloroform containing 1% methanol as the solvent gives a major band at about Rf 0.3, which is detectable by ultraviolet. Elution with ethyl acetate gives a 390 mg. residue which is crystallized from acetone-hexane to give 309 mg. of $\Delta^3$-A-norandrostene-11α-ol-2,17-dione.

*Example 6*

Following the procedure in Example 5, but varying the fermentation incubation time, there is obtained $\Delta^3$-A- norandrostene-11α-ol-2,17-dione and/or Δ³-A-norandrostene-11α,17β-diol-2-one from A-norprogresterone, A-nortestosterone, and Δ³-A-norandrostene-2,17-dione. A mixture of Δ³-A-norandrostene-11α-ol-2,17-dione and Δ³-A-norandrostene-11α,17β-diol-2-one is separable by plate chromatography on neutral alumina (Activity V).

Similarly, by following the procedure set forth in Example 3, but substituting the free hydrogen compounds obtained in Example 6, the respective acylated derivatives are prepared.

*Example 7.—Δ³-A-norandrostene-2,11,17-trione*

A solution of 500 mg. of Δ³-A-norandrostene-11α-ol-2,17-dione in 15 ml. of acetone is treated dropwise with stirring with an excess of chromium trioxide-sulfuric acid. The reaction mixture is stirred for two minutes and then methanol is added. The inorganic residue is removed by filtration and washed with additional acetone. The filtrate and washings are concentrated and then diluted with water. Filtration gives 82 mg. of Δ³-A-norandrostene-2,11,17-trione having melting point 190.5–192.5°. The filtrate is extracted three times with chloroform. The chloroform extracts are washed with 8% salt solution, dried over sodium sulfate and evaporated to dryness. Crystallization of the residue from acetone-hexane gives an additional 329 mg. of Δ3-A-norandrostene-2,11,17-trione having melting point 188–190°. Recrystallization from acetone-hexane gives the analytical sample having M.P. 190–190.5°; $[\alpha]_D^{23}+163°$ (EtOH);

$\lambda_{max}^{KBr}$ 5.73, 5.86, 5.93 (sh.), and 6.17 μ; $\lambda_{max}^{EtOH}$ 226 mμ (11,100).

*Analysis.*—Calc'd for $C_{18}H_{22}O_3$ (286.36): C, 75.49; H, 7.74. Found: C, 75.60; H, 7.71.

The invention may be variously otherwise embodied within the scope of the appended claims.

What is claimed is:
1. A compound of the formula

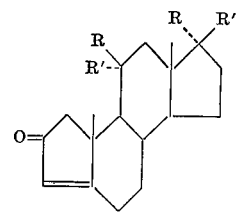

wherein each R is hydrogen; each R' is selected from the group consisting of hydroxy and acyloxy wherein the acyl radical is from a hydrocarbon carboxylic acid of less than twelve carbon atoms; and together R and R' is oxo (O=).

2. Δ³-A-norandrostene-11α-ol-2,17-dione.
3. Δ³-A-norandrostene-11α,17β-diol-2-one.
4. Δ³-A-norandrostene-11α-ol-2,17-dione Acetate.
5. Δ³-A-norandrostene-11α,17β-diol-2-one Diacetate.
6. Δ³-A-norandrostene-2,11,17-trione.

References Cited
UNITED STATES PATENTS 2,656,370  10/1953  Murray et al. _____ 260—397.4
3,110,733  11/1963  Weisenborn et al. ____ 260—488

OTHER REFERENCES
Chemical Abstracts, 49:9022a (1955).

LORRAINE A. WEINBERGER, *Primary Examiner.*

V. G. GARNER, *Assistant Examiner.*